(12) United States Patent
Dura et al.

(10) Patent No.: US 9,235,312 B2
(45) Date of Patent: Jan. 12, 2016

(54) SYNCHRONIZED PANEL TECHNOLOGY

(75) Inventors: Daniel A. Dura, Garland, TX (US);
Matthew R. Bugbee, Plano, TX (US)

(73) Assignee: Dedo Interactive, Inc., Plano, TX (US)

( * ) Notice: Subject to any disclaimer, the term of this patent is extended or adjusted under 35 U.S.C. 154(b) by 343 days.

(21) Appl. No.: 13/279,823

(22) Filed: Oct. 24, 2011

(65) Prior Publication Data

US 2012/0192084 A1 Jul. 26, 2012

Related U.S. Application Data

(60) Provisional application No. 61/406,394, filed on Oct. 25, 2010, provisional application No. 61/415,120, filed on Nov. 18, 2010.

(51) Int. Cl.
*G06F 15/00* (2006.01)
*G06F 13/00* (2006.01)
*G06F 3/0481* (2013.01)

(52) U.S. Cl.
CPC .................... *G06F 3/0481* (2013.01)

(58) Field of Classification Search
CPC .................................................. G06F 3/0481
USPC ......... 715/762–765, 751–753, 741–744, 853, 715/781, 727
See application file for complete search history.

(56) References Cited

U.S. PATENT DOCUMENTS

| | | | | |
|---|---|---|---|---|
| 8,130,928 B2* | 3/2012 | Bookstaff | ................ | 379/201.01 |
| 8,463,765 B2* | 6/2013 | Lesavich | ........................ | 707/706 |
| 2003/0172020 A1* | 9/2003 | Davies et al. | .................... | 705/36 |
| 2006/0168532 A1* | 7/2006 | Stevens et al. | ................. | 715/753 |
| 2011/0283329 A1* | 11/2011 | Davis et al. | ........................ | 725/62 |
| 2011/0320300 A1* | 12/2011 | Broms et al. | .................. | 705/26.2 |
| 2013/0007895 A1* | 1/2013 | Brolley et al. | ................... | 726/28 |
| 2013/0038548 A1* | 2/2013 | Kitada et al. | ................... | 345/173 |
| 2013/0198009 A1* | 8/2013 | Pappas et al. | ............... | 705/14.66 |

\* cited by examiner

*Primary Examiner* — Kevin Nguyen
(74) *Attorney, Agent, or Firm* — Westman, Champlin & Koehler, P.A.; Theodore M. Magee (57) ABSTRACT

Synchronized panel technology is provided. A method illustratively includes receiving indications of a first form factor and a second form factor. Content that is to be shared is identified. A first user interface is generated that includes the content and that is configured to be displayed on a computing device screen having the first form factor. A second user interface is generated that includes the content and that is configured to be displayed on a computing device screen having the second form factor. Indications of a first and second resolution are optionally received and utilized in generating the first and second user interfaces.

7 Claims, 10 Drawing Sheets

Fig. 10

SYNCHRONIZED PANEL TECHNOLOGY

REFERENCE TO RELATED CASES

The present application is based on and claims the priority of provisional patent application Ser. No. 61/406,394, filed on Oct. 25, 2010, and Ser. No. 61/415,120, filed on Nov. 18, 2010, the contents of which are hereby incorporated by reference in their entirety.

BACKGROUND

Over the past decade, several products in the telecommunication and telepresence areas have been introduced. Some of these products have been directed at enabling remote communication between multiple users. For instance, certain products have enabled remote users to view a common window within their individual displays. The remote users may use such products to review a document at the same time. Other products have included features such as relaying audio or video signals such that remote users can view or hear each other during a meeting in which the users are at different physical locations.

SUMMARY

An aspect of the disclosure relates to synchronized panel technology. In one embodiment, a method includes receiving indications of a first form factor and a second form factor. Content that is to be shared is identified. A first user interface is generated that includes the content and that is configured to be displayed on a computing device screen having the first form factor. A second user interface is generated that includes the content and that is configured to be displayed on a computing device screen having the second form factor. Indications of a first and second resolution are optionally received and utilized in generating the first and second user interfaces.

In another embodiment, a synchronized panel technology method includes placing an identifier on a first computing device and utilizing the first computing device to select content to be shared. A reader associated with a second computing device is utilized to read the identifier. An indication of the identifier is sent to a cloud computing network, and the cloud computing network is utilized to synchronize the selected content between the first and the second computing devices. In certain embodiments, the synchronization is optionally initiated based upon a gesture, and the identifier on the first computing device is an RFID tag.

These and various other features and advantages that characterize the claimed embodiments will become apparent upon reading the following detailed description and upon reviewing the associated drawings.

DETAILED DESCRIPTION

Embodiments of the present disclosure include synchronized panel technology. In some embodiments, multiple devices are communicatively coupled to each other such that content (e.g. data, reports, multimedia files, audio, video, images, applications, etc.) are shared amongst the devices in real-time. The devices may include devices having different form factors and/or resolutions. In such a case, embodiments of the present disclosure generate a user interface tailored for each form factor/resolution such that users of the multiple devices can have a common experience viewing and interacting with the content, despite the different form factors and/or resolutions of the devices. Other embodiments include methods of synchronizing content between multiple devices using technologies such as, but not limited to, RFID technology. Accordingly, at least certain embodiments may be advantageous in that they enable collaboration between local and remote users in real-time on different devices. These and various other features and advantageous of embodiments of the present disclosure are described below and shown in the accompanying figures.

SECTION I. OVERVIEW OF SYNCHRONIZATION PANEL TECHNOLOGY

Figure 1:
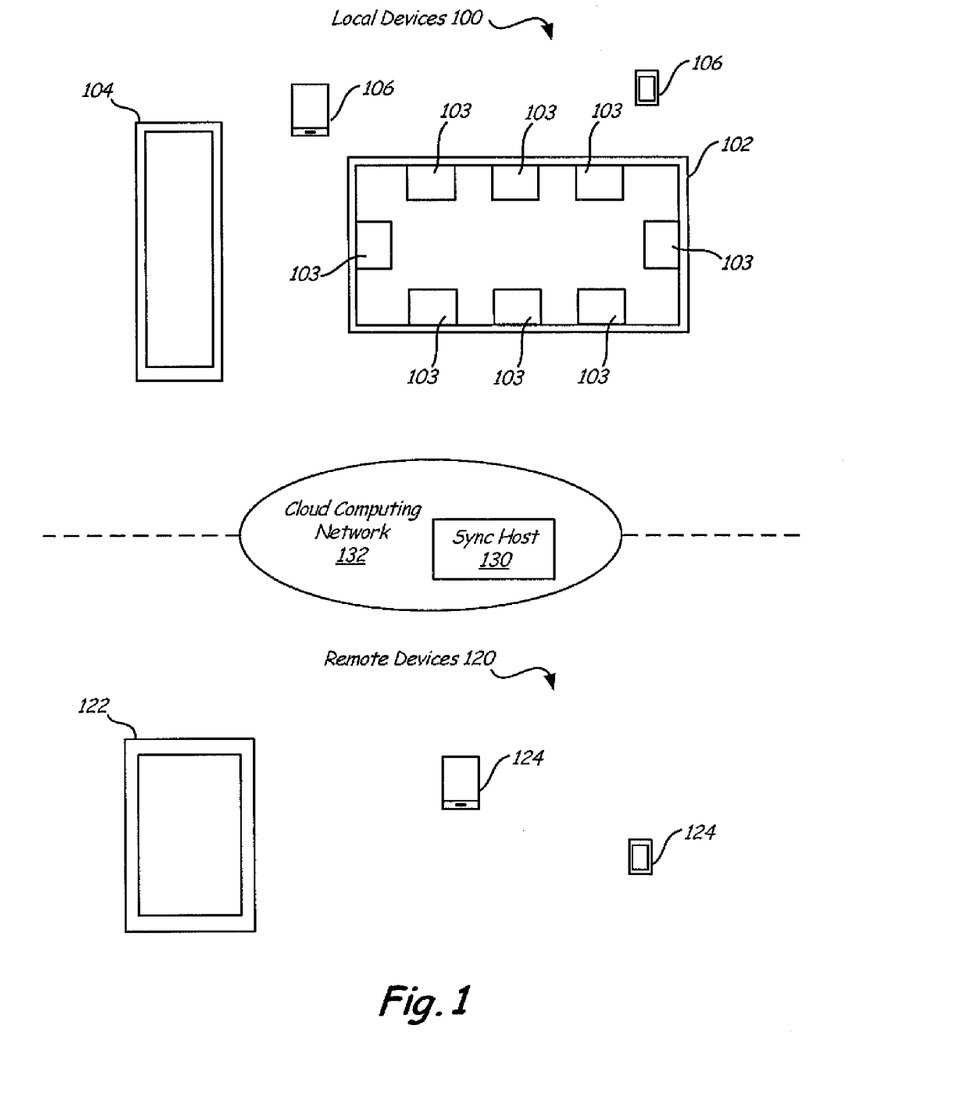
FIG. 1 is a block diagram of local devices and remote devices being synchronized utilizing a cloud computing network.

FIG. 1 shows one illustrative operating environment in which synchronized panel technology may be incorporated in. Embodiments are not however limited to any particular environment and may be practiced in environments different than the one shown in FIG. 1. In FIG. 1, there are local devices 100 that are at one location, and there are remote devices 120 that are at one or more different, remote locations. Each of the local and remote devices is illustratively communicatively coupled to one another utilizing a synchronization host 130 that is optionally located within a cloud computing system 132.

In one embodiment, local devices 100 include a board room table 102, a shared work area/module 104, and one or more portable devices 106. Board room table 102 illustratively includes a number (e.g. any number N) of personal work areas/modules 103. Each personal work area/module 103 may include a multitouch screen or other display that enables a user to view and interact with content on an individual basis. Shared work area/module 104 illustratively includes a large viewing area that enables multiple users to simultaneously view the same content. For instance, module 104 may include a large multitouch screen that enables multiple people to view a presentation at the same time. Portable devices 106 can include any type of portable device such as, but not limited to smartphones, personal digital assistances, music players, tablet computers, netbooks, and notebooks.

Remote devices 120 optionally include any number of devices (including zero). In the embodiment shown in FIG. 1, remote devices 120 include one larger device 122 (e.g. a personal computer with a multitouch display) and one or more portable devices 124. As will be understood by those skilled in the art, the local devices 100 and remote devices 120 may include screens having different form factors (e.g. screen sizes) and/or different resolutions (e.g. different pixels per square inch).

In one embodiment, synchronization host 130 synchronizes content between each of the local devices 100 and remote devices 120. For instance, synchronization host 130 illustratively generates a user interface tailored for each form factor/resolution such that the users of the multiple devices can have a common experience viewing and interacting with the content, despite the devices having different form factors and/or resolutions. Accordingly, embodiments of the present disclosure enable sharing and collaboration between both user that are in the same place, and between users that are at remote locations.

Figure 2:
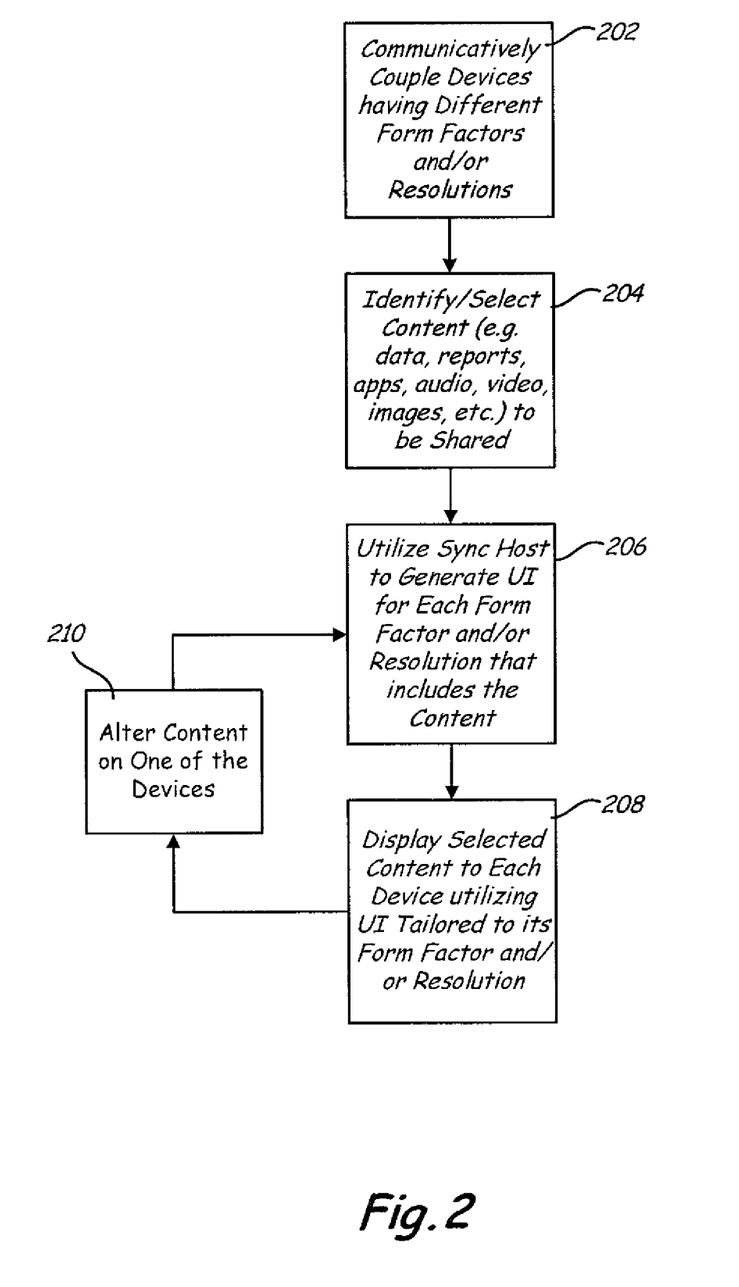
FIG. 2 is a flow chart of a method of utilizing a cloud computing network to synchronize computing devices.

FIG. 2 is a flow diagram illustrating one method of implementing synchronized panel technology. At block 202, a number of devices having different form factors and/or resolutions are communicatively coupled to each other. At block 204, content that is to be shared is selected. At block 206, a synchronization host is utilized to generate user interfaces for each of the devices. In particular, user interfaces are generated that have common information (e.g. the selected content), but are tailored for the specific form factors and resolutions of each device. At block 208, the generated user interfaces are displayed on the associated device such that the selected data or application is displayed similarly on each device. At block 210, the selected content is optionally altered on any one of the devices, and the user interfaces are generated/update to account for the alteration.

Figure 3:
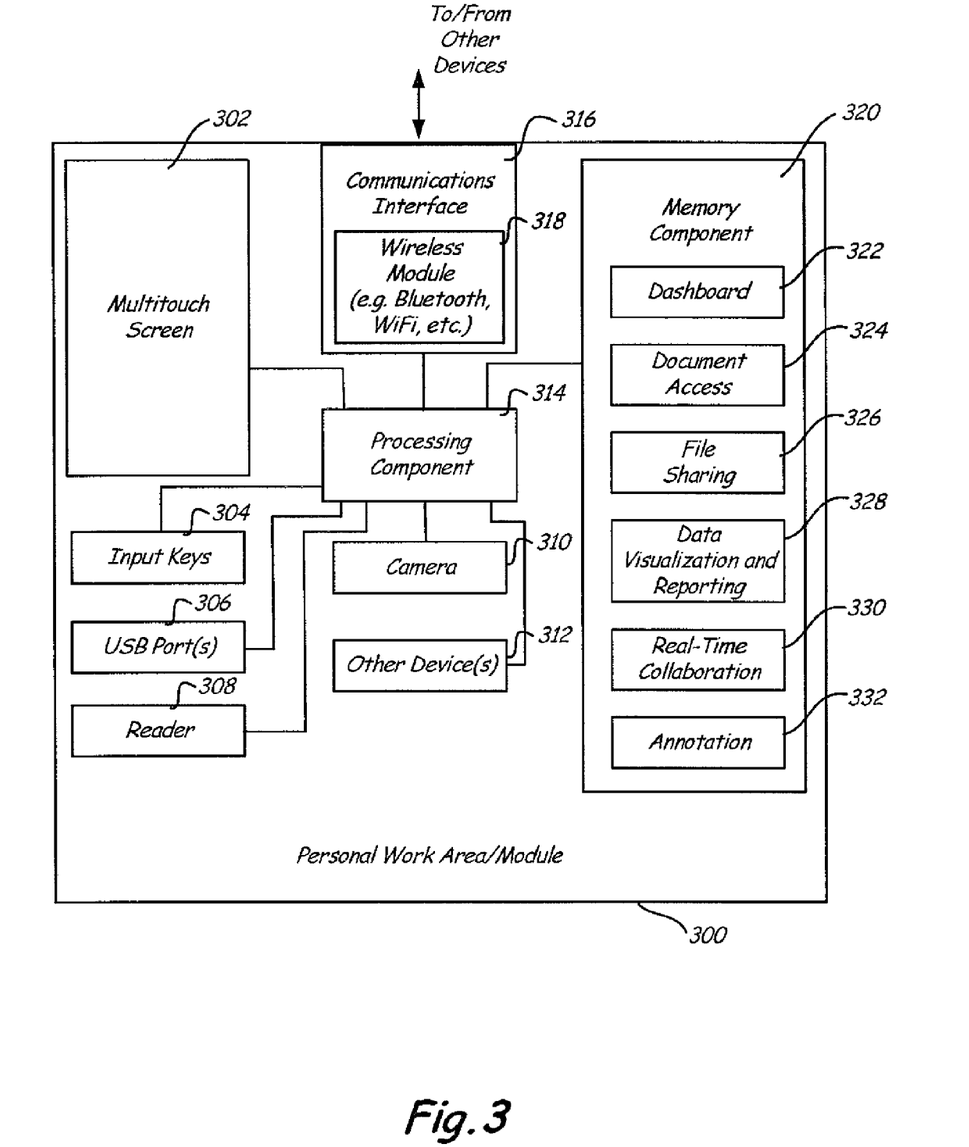
FIG. 3 is a block diagram of a personal work area/module.

FIG. 3 is a schematic diagram of one example of a personal work area/module 300. Module 300 can be in incorporated within an environment such as that shown in FIG. 1. For instance, board room table 102 may include a module 300 at each of its personal work areas 103. Also for instance, devices 104, 106, 122, and/or 124 in FIG. 1 optionally include one or more features of module 300.

Module 300 illustratively includes a multitouch screen 302, input keys 304, USB port(s) 306, a reader 308 (e.g. RFID, barcode, or NFC reader), a camera 310, other device(s) 312, a processing component 314, a communication interface 316, a wireless module 318, and a memory component 320.

In one embodiment, module 300 (e.g. screen 302) is made of a solid glass surface that utilizes capacitive touch foil and LCD technology to enable a user to have a personalized computing experience. The under glass mounted panels and touch foil provides touch detection without the issue of false touches from items placed on the table surface (e.g. pens, papers, cups, etc.).

The camera 310 is illustratively a surface mounted camera that is embedded into a table (e.g. table 102 in FIG. 1) and allows for individuals at the table to remotely project their image to remote users or allows for recording of meeting proceedings.

Reader 308 illustratively allows a user to login to a table (e.g. table 102 in FIG. 1) using an identifier (e.g. RFID tag/badge, barcode, NFC chip, etc.). Possible integration with existing systems could allow the user to interact with a file share and access documents, media, and presentations that they would like to share with other attendees or the entire room.

USB port(s) 306 are illustratively surface mounted USB ports that allow users to have access to files by plugging a portable USB flash drive into a USB port mounted into the surface of the table. Additionally, in one embodiment, wireless module 318 includes Bluetooth connectivity that allows users to connect their Bluetooth enabled device(s) to the table to save and/or retrieve files.

Other device(s) 312 optionally includes any one or more additional devices that may provide other useful features. For example, in one embodiment, other devices 312 include audio and visual sensors (e.g. microphones, IR cameras, etc.) that enable a user to input commands or control devices using gestures. For example, devices 312 could include three dimensional infrared sensing technology that can be used to recognize gestures made by a user. Embodiments of devices 312 can include any one or more devices used to recognize gestures or otherwise input a command.

As shown in FIG. 3, memory component 320 illustratively includes a number of data and/or application modules. Some examples of items that may be included in memory 320 include a dashboard component 322, a document access component 324, a file sharing component 326, a data visualization and reporting component 328, a real-time collaboration component 330, and an annotation component 332.

Dashboard component 322 illustratively provides a home screen of an application that allows users to see what data they have access to, recent documents that have been shared with them, and/or view news that relates to topics they have expressed interest in.

Document access component 324 illustratively shows users what files that they have access to. In an embodiment, a user must first authenticate themselves to the system before gaining access to any files. The authentication can be performed for example by using a password, biometric authentication, RFID authentication, etc. Once a user has authenticated themselves to the system, they will have access to files that they have uploaded to the system. Documents will be automatically converted into a format that allows for easy sharing and viewing on all screens and devices.

Data visualization and reporting component 328 enables a user (e.g. an analyst) to be able to upload data sets that users can access across all of the connected devices. They can view and interact with that data in user interfaces that are targeted to their specific device. User interfaces will be designed to target the specific use case allowing them to quickly analyze the information and also modify the data set to fit their current needs.

Real-time collaboration component 320 allows users to be able to invite other users and entire conference rooms to collaborate with them on whatever document, data set, or media they are accessing. They can share video and audio using the camera and microphone on their device or in the room.

Annotation component 322 allows users to annotate the content (e.g. files and media) using a set of digital white boarding tools. Users will be able to specify whether other individuals can see their annotations, or they can make them private. Annotations will also occur in real time such that during collaboration sessions, users viewing the content on other screens will be able to see annotations happen in real-time.

Some features that are optionally included within module 300 include hardware based authentication, facial recognition based authentication, physical gesture recognition, offline data access, remote control, cloud based screen sharing, and pause and resume session. As previously mentioned, in one example, hardware based authentication includes enabling users to authenticate with an application via an RFID badge that they carry. With facial recognition based authentication, users are able to log-into kiosks and other hardware without the need for RFID badges or authentication tokens. Utilizing built in cameras and facial recognition software, as a user approaches a kiosk, it will immediately load the users settings and preferences. As the user departs the kiosk, it will lock that session to prevent tampering. Physical gesture recognition allows users to interact with documents and data using a set of predefined gestures while not directly interacting with the screen. With offline data access, all data or a portion of data is synchronized and stored locally so that users can view documents and information independent of the status of their connection to the network. In remote control, when users are presenting data within the scope of a collaboration or screen sharing session, the application will modify itself to act as a control for that data. In cloud based screen sharing, users can share any document they are viewing or data set that they are accessing on any screen that they have access to without the need to plug-in to that screen. Once authenticated, they select the screen they want to present to from within the user interface of the application and the data will be synchronized across those devices. With pause and resume session, a user is able to pause a given session and resume it from any other screen where he can access the application. This will allow him or her to move from a tablet or PDA to a screen in his office without having to find documents and data or re-invite users to a given collaboration session.

Figure 4:
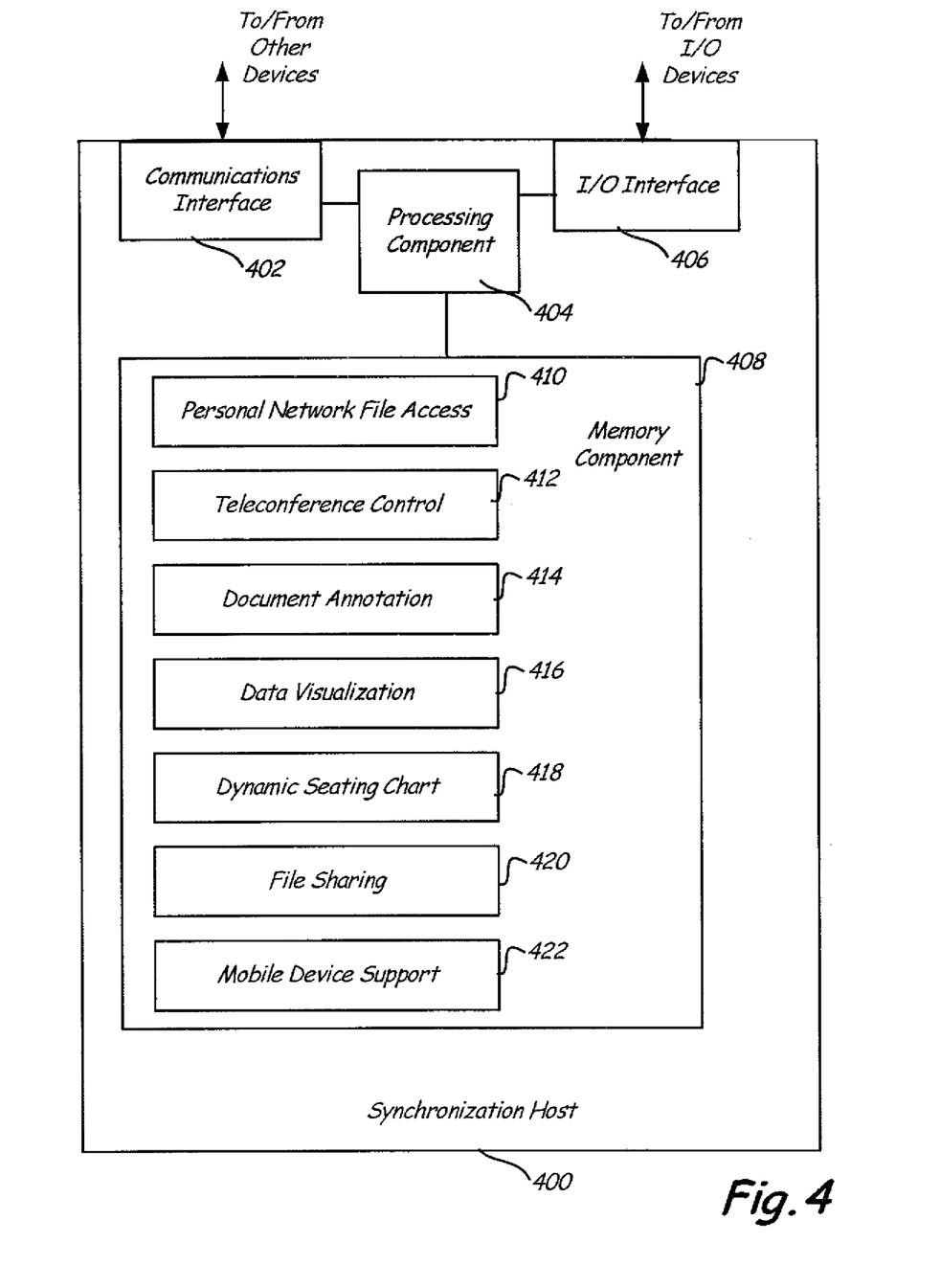
FIG. 4 is a block diagram of a synchronization host.

FIG. 4 is a schematic diagram of one example of a synchronization host 400. Host 400 can be in incorporated within an environment such as that shown in FIG. 1 (e.g. host 130 in FIG. 1). In an embodiment, a system is architected using a client/server model which maintains all documents, media, assets, data, application state, and collaboration information in a cloud (e.g. cloud 132 in FIG. 1) such that users will be able to access the functionality from multiple hardware and software platforms. In certain configurations, a portion of the client specific data, documents, and services is stored on the client and utilize peer-to-peer connectivity which will help reduce system complexity but still provide the expected user experience.

Host 400 optionally includes a communications interface 402, a processing component 404, an input/output ("I/O") interface 406, and a memory component 408. Memory component 408 illustratively includes any data, applications, operating systems, etc. that may be needed or useful in implementing synchronized panel technology. As can be seen in the figures, some examples of components included within memory 408 include a personal network file access component 410, a teleconference control component 412, a document annotation component 414, a data visualization component 416, a dynamic seating chart component 418, a file sharing component 420, and a mobile device support component 422.

With personal network file access component 410, once a user authenticates (e.g. badges-in) to the table, component 410 will enable the user to have access to personal files that they have placed into a network accessible user folder. Documents are automatically converted into a format that allows for easy sharing and viewing on all screens of the meeting room and with remote users on other devices such as PDAs and tablet computers.

With teleconference component 412, users will be able to invite and approve all remote meeting attendees. Attendees will be able to see the users who have joined the meeting as well as photos and video if made available.

With document annotation component 414, while presenting presentations, files, and other media, both local and remote users can further annotate the content using a set of digital white boarding tools. These sessions can then be saved for later access by users of the table.

With data visualization component 416, by synchronizing data sets across all connected devices, users can view and interact with data in user interfaces that are targeted to their specific device. Rich user interfaces can be designed which target the specific reports and information that are desired by the users allowing them to focus on the data and not figuring out how to access that data.

With dynamic seating chart component 418, as users authenticate (e.g. badge-in) to the table or device their names populate on a seating chart in their corresponding position around the table. The seating chart would become a visual element for file sharing and for general reference during the meeting. This chart could appear on secondary screens in the meeting room and also include photos and video of individuals who are joining the meeting remotely.

With file sharing component 420, users will have the option of sharing files with other users in a 1-to-1 or 1-to-Many manner using the Seating Chart to select who to send files to.

With mobile device support 422, using a device (e.g. tablet, smarphone, etc.) users will be able to remotely join meetings which they cannot attend in person or access data that was shared with them within a meeting. For example, if a document is being shared with a room during a meeting, a user would be able to remotely store screenshots of the meeting or documents that were made available to them on their tablet for later viewing.

Figure 5:
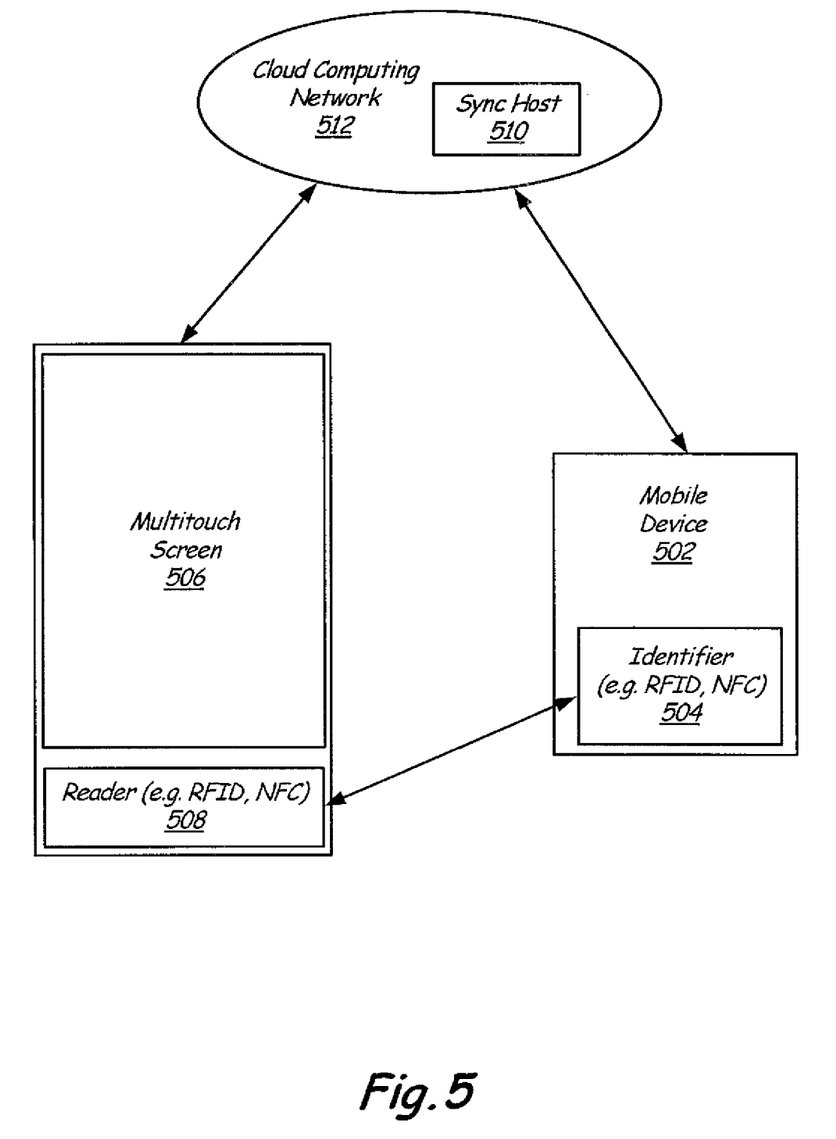
FIG. 5 is a block diagram of computing devices being synchronized utilizing an identifier.

FIG. 5 shows another illustrative operating environment in which synchronized panel technology may be incorporated in. Embodiments are again not limited to any particular environment and may be practiced in environments different than the one shown in FIG. 5. In FIG. 5, a user is transporting (e.g. holding and carrying) a mobile device 502 (e.g. tablet, smartphone, etc.). Mobile device 502 is illustratively associated with an identifier 504 that can be used to uniquely identify and distinguish the mobile device 502 from other devices. For instance, in one embodiment, identifier 504 is a barcode, an RFID tag, or an NFC chip that is placed on or incorporated within device 502. The user illustratively approaches another device 506 (e.g. a kiosk having a multitouch screen, a personal computer, another mobile device, etc.). The other device 506 has an associated reader 508 that can read the identifier 504. For instance, reader 508 is optionally a barcode reader, an RFID reader, an NFC reader, etc.

In an embodiment, device 506 utilizes its reader 508 to read the identifier 504 on device 502. Device 506 then sends the identifier to a synchronization host 510 that is in a cloud computing environment 512. The cloud 512 communicates with both devices 506 and 502 such that content can be shared between the two devices 502 and 506.

Figure 6:
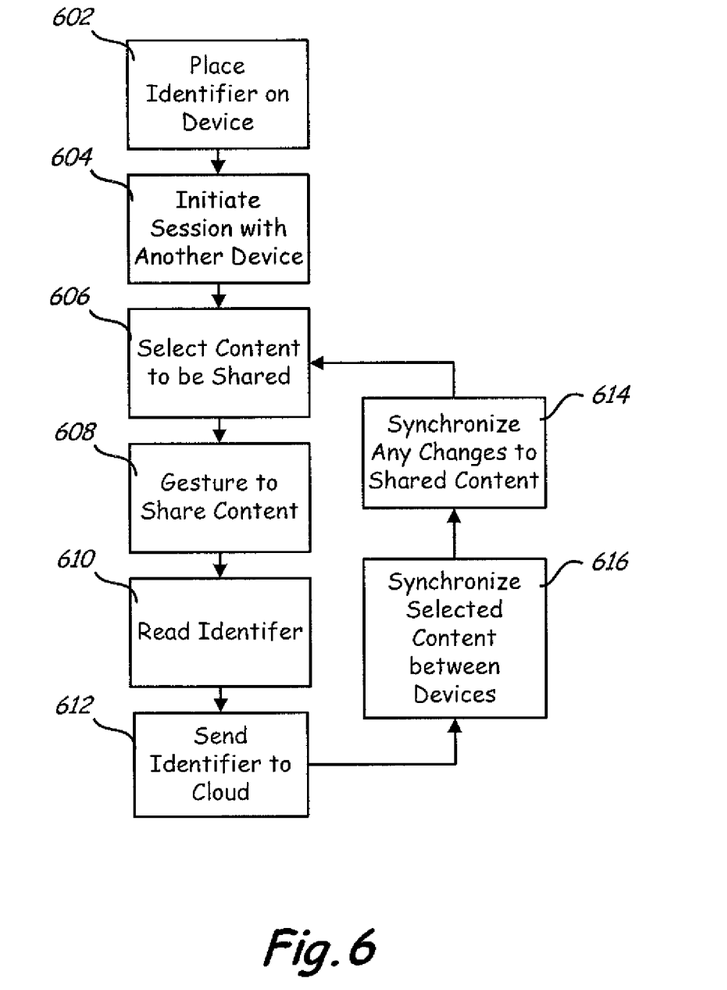
FIG. 6 is a flow chart of a method of utilizing an identifier to synchronize computing devices.

FIG. 6 is a flow diagram illustrating one method of using an identifier (e.g. barcode, RFID tag, NFC chip, etc.) as a mechanism to share content (e.g. data and/or applications) between multiple devices. At block 602, an identifier is placed on or within a device. The identifier is illustratively a unique identifier that can be used to distinguish the device from other devices. At block 604, a user with the device initiates a session with another device. For instance, the other device may be a large multitouch screen and the user initiates a session by touching the screen. At block 606, some content is selected (e.g. brought-up) on the user's device. At optional block 608, a gesture is made to share the selected content with the other device. For example, a user may wave his device in front of or in the direction of the other device. At block 610, a reader associated with the other device reads the identifier on the user's device. At block 612, the other device sends an indication of the identifier to a cloud computing system. At block 614, a synchronization component within the cloud computing system synchronizes the selected data between the two devices such that the selected content is now available for viewing, interacting, etc. on the other device. At block 616, any changes made to the shared content is synchronized between the two devices. As will be appreciated by those skilled in the art, the above described method can be extended to share content between any number of devices and is not limited to only sharing content between two devices.

SECTION II. EXAMPLES OF ILLUSTRATIVE USER INTERFACES

FIGS. 7, 8, 9, and 10 illustrate some example of user interfaces that may be utilized in implementing synchronized panel technology. It should be noted that these user interfaces are being provided for illustration purposes only, and that embodiments are not limited to any particular user interfaces and can include user interfaces other than the specific examples shown in the figures.

Figure 7:
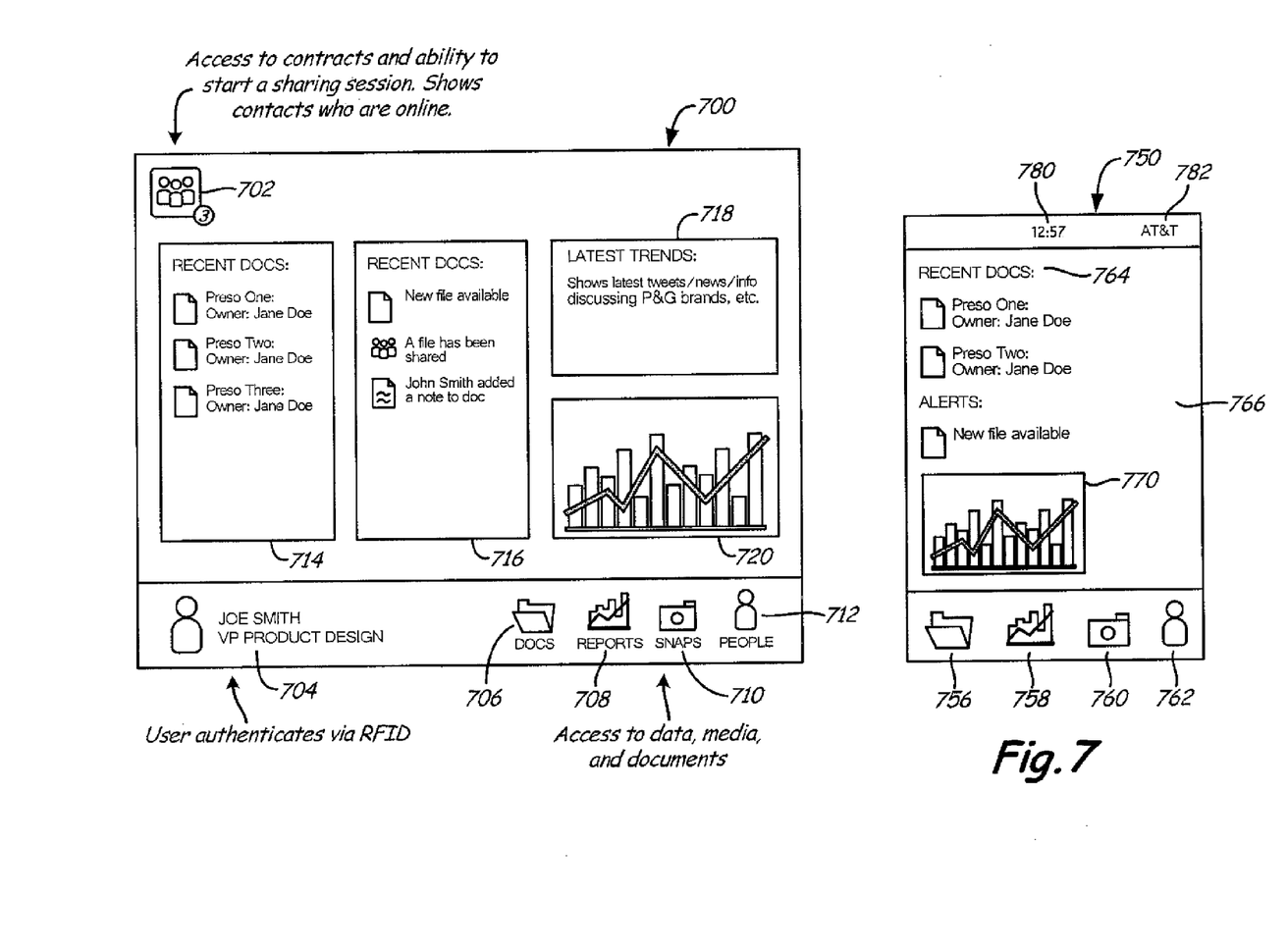
FIG. 7 is an illustration of a home page user interface for two different form factors.

FIG. 7 illustrates two examples of a home page user interface. As previously mentioned, user interfaces are illustratively generated to accommodate for different form factors and resolutions, while still presenting similar information. In FIG. 7, a larger homepage 700 is illustratively displayed on a device having a larger form factor such as, but not limited to, a tablet computer, a personal computer, etc., while a smaller homepage 750 is illustratively displayed on a device having a smaller form factor such as, but not limited to, a smarthpone, PDA, digital music player, etc.

Homepage 700 optionally includes a contacts icon 702 that enables a user to access contacts and the ability to start sharing a session. In an embodiment, icon 702 shows how many users are currently online (e.g. three in FIG. 7). If the user selects icon 702, the names or other identifiers of the users who are online are shown, and the device user can select one or more of the users to begin sharing content with.

Homepage 700 also includes a self identifying icon 704. In an embodiment, icon 704 shows an indication of an identity of the user who is currently logged-on or authenticated to the device (e.g. through an RFID badge, biometric authentication, password, etc.). In the specific example shown in the figure, a "Joe Smith" who is the vice president of product design is logged-on.

Homepage 700 illustratively includes a documents icon 706, a reports icon 708, an images icon 710, and a people icon 712. These icons provide access to data, media, documents, and people. For instance, if documents icon 706 is selected, the user is presented with a list of documents that he has access to. Similarly, if report icon 708 is selected, the user is presented with a list of reports that he has access to, and if images icon 710 is presented, the user is presented with a list of images (e.g. photographs, JPEGs, GIFs, etc.) that he has access to. Homepage 700 can further have additional icons as necessary for example to provide access to video files, audio files, etc. In an embodiment, if people icon 712 is selected, a list of people (e.g. contacts or other system users) are presented to the user. For example, the list of people may be presented to enable the user to invite those people to a meeting, send an instant message/text message, send an email, etc.

Homepage 700 may also include a recent documents section 714, an alerts section 716, a latest trends section 718, and a graph section 720. Recent document section 714 illustratively lists the most recent documents that were accessed on the device or by the user on any device. Section 714 may list identifying information for each of the documents such as, but not limited to a title, file name, owner, size, date, etc. The user can optionally open one of the documents by selecting the corresponding icon.

Alerts section 716 illustratively includes automatically generated (e.g. machine generated) notifications to the user about information that he may interested in. For instance, in the specific example shown in the figure, the alerts section identifies that a new file is available, that file has been shared, and that John Smith has added a not to doc. The user can obtain further details about any of the alerts by selecting (e.g. clicking) on the specific alert.

Latest trends section 718 illustratively shows any trending information that the user may be interested in. The information can be automatically generated, manually generated, or semi-automatically generated. For example, a user could specify one or more categories of information that he is interested in, and information related to those categories can be automatically compiled by a computer and presented within section 718. Section 718 may have for example latest blog or microblog information (e.g. "Tweets"), news articles, press releases, etc.

Graph section 720 illustratively graphs any information that the user may be interested in. Again, the information may be automatically generated, manually generated, or semi-automatically generated. For example a user could specify information (e.g. stock prices, trading volume, number of blog mentions, etc.) that he is interested in, and it would be graphed in section 720.

As can be seen in FIG. 7, smaller homepage 750 illustratively includes similar content to larger homepage 700, but the information is presented in a different manner to accommodate for the smaller form factor. In the specific embodiment shown in the figure, some of the information included in the larger homepage 700 is left off of (i.e. removed from) the smaller homepage 750. In other embodiments, the two homepages can have the same content arranged in the same manner, may have the same content arranged in different manners, or may have related but not identical content arranged in different manners. For example, in FIG. 7, smaller homepage 750 includes a document icon 756, a reports icon 758, an images icon 760, a people icon 762, a recent document section 764, an alerts section 766, and a graph section 770, that correspond respectively to icons 706, 708, 710, 712, 714, 716, and 720 in larger homepage 700. Smaller homepage 750 may include additional information not included in the larger homepage 700, such as, but not limited to, a time 780 and a wireless signal carrier/strength indicator 782.

Figure 8:
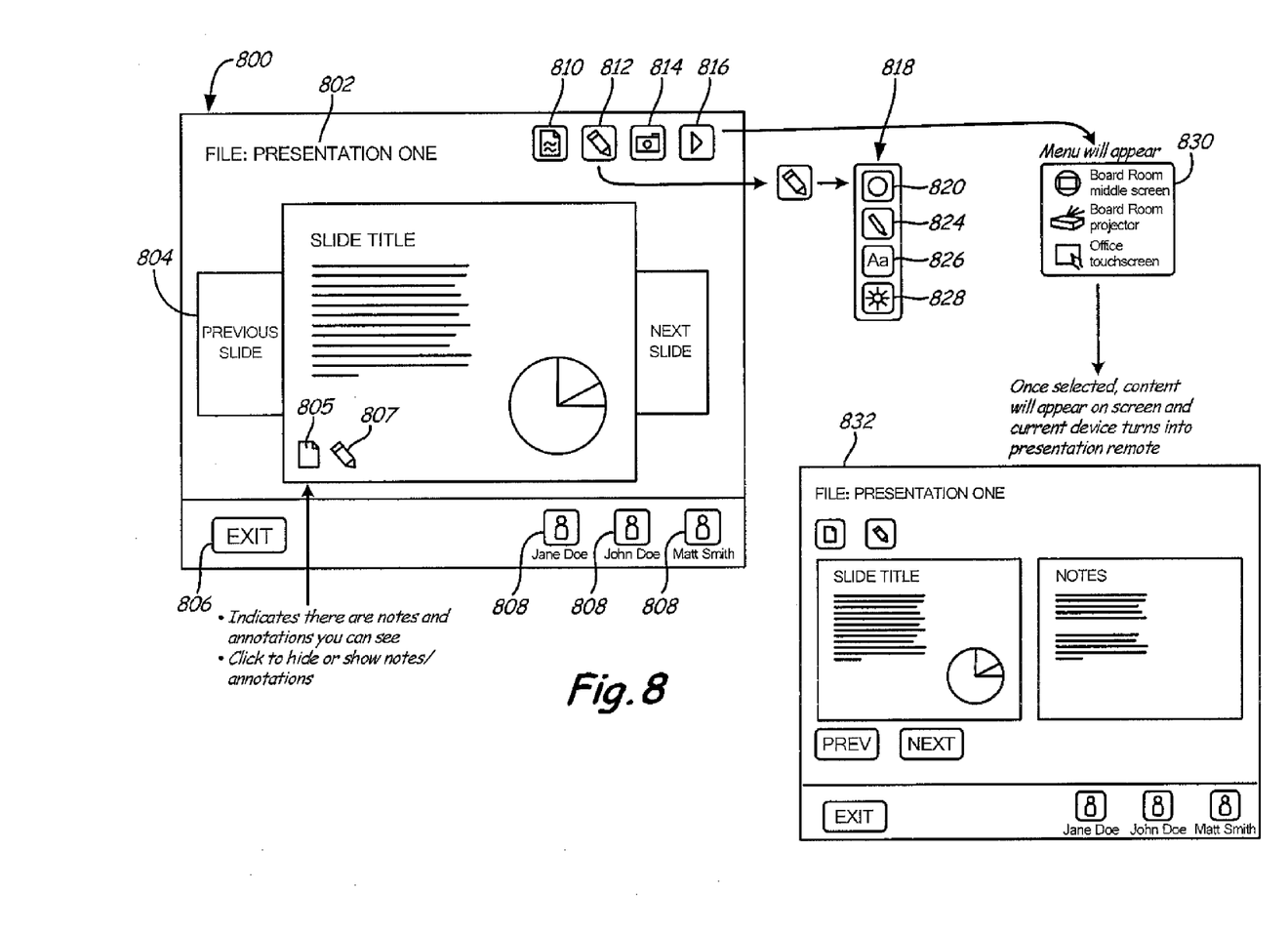
FIG. 8 is an illustration of user interfaces associated with a presentation application.

FIG. 8 illustrates some exemplary user interfaces for showing how a presentation might be viewed within an application. User interface 800 includes a file name section 802, a display section 804, an exit button 806, people icons 808, an add note icon 810, an annotation tool icon 812, a screen cap icon 814, and a present on screen icon 816. In other embodiments, more or fewer icons can be shown within a user interface 800 (e.g. depending on form factor, resolution, etc.).

File name section 802 shows the name of the currently selected file. Display section 804 shows content of the currently selected file. For example, in the example shown in the figure, one slide of a presentation is shown in the center of section 804, and a user can move to a previous slide or a next slide by selecting the icons to the left and right of the center slide. Section 804 may also include a notes icon 805 that enables a user to view notes and an annotation icon 807 that enables a user to annotate a slide. Exit button 806 illustratively allows a user to exit the current presentation and/or to exit the collaboration session. People icons 808 show the current people that are being collaborated with. Icons 808 in an embodiment show video or images of the particular people. Icons 808 also illustratively enable the user to add and/or remove contacts from the session. Additionally, if a people icon 808 is selected, the selected person's video can be shown on the full screen.

Add note icon 810 illustratively enables a user to add a note to the current presentation or to a different presentation. Annotations tool icon 812 illustratively enables a user to annotate the current presentation. For instance, as shown in FIG. 8, if icon 810 is selected, a toolbar 818 is displayed that provides further annotating icons such as, but not limited to, shapes icon 820, highlights icon 822, text icon 824, and spotlight icon 826. Those icons illustratively enable a user to add shapes, highlights, text, and spotlights to the current presentation by selecting the appropriate icon. Screen cap icon 814 illustratively captures an image of the content of the currently viewable screen and saves that image for later review.

Selection of present on screen icon 816 illustratively generates toolbar 830 that gives different selectable options (e.g. present with projector, on large touchscreen, on tablet, etc.) for a type of presentation. Once selected, a screen 832 is presented and content will appear on screen while the current device turns into a presentation remote.

Figure 9:
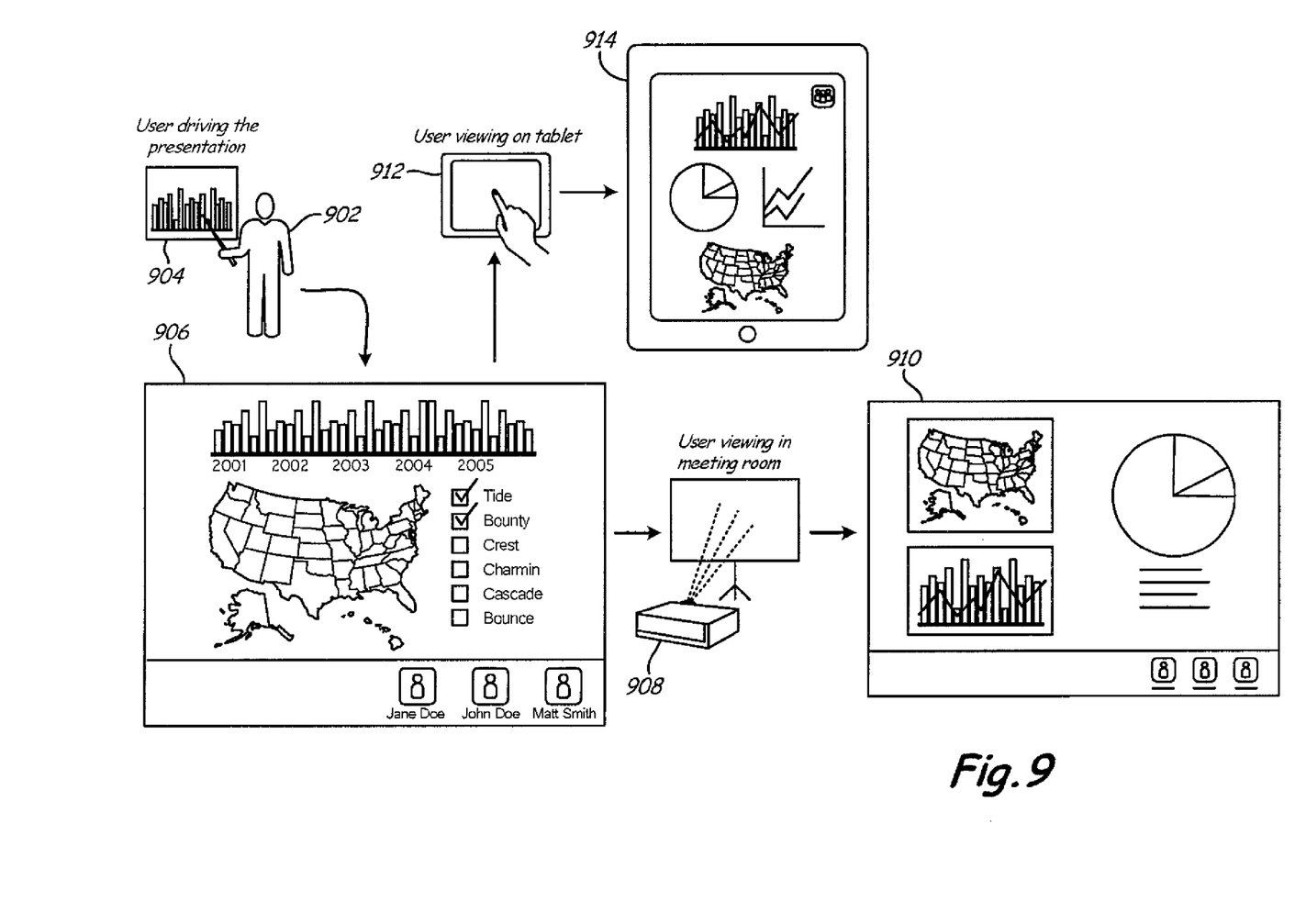
FIG. 9 is an illustration of user interfaces associated with a custom reporting application.

FIG. 9 illustrates some exemplary user interfaces for showing a custom reporting application that allows users to have access to data uploaded by an analyst. Users can then collaborate in real-time and annotate the on-screen information. Depending on the device, user will be presented with a custom user interface targeted at the device's functionality and form factor.

In FIG. 9, a user/presenter 902 is driving a presentation on a first display screen 904. The user 902 may have access to a main screen 906 that shows a different view of the presentation (e.g. more or less content than screen 904). Data from the main screen 906 may be fed to a projector 908 that projects another user interface 910 that can be viewed by multiple people. Furthermore, content from screen 906 may be fed to a tablet 912 that displays yet another user interface 914. Accordingly, a single source of content (e.g. a selected presentation) is simultaneously displayed on different devices having different form factors and resolutions. Accordingly, collaboration during a presentation can be enhanced by providing multiple views of the same content in real-time to multiple devices. This synchronization is illustratively performed by a synchronization host such as host 130 in FIG. 1 or by host 400 in FIG. 4.

Figure 10:
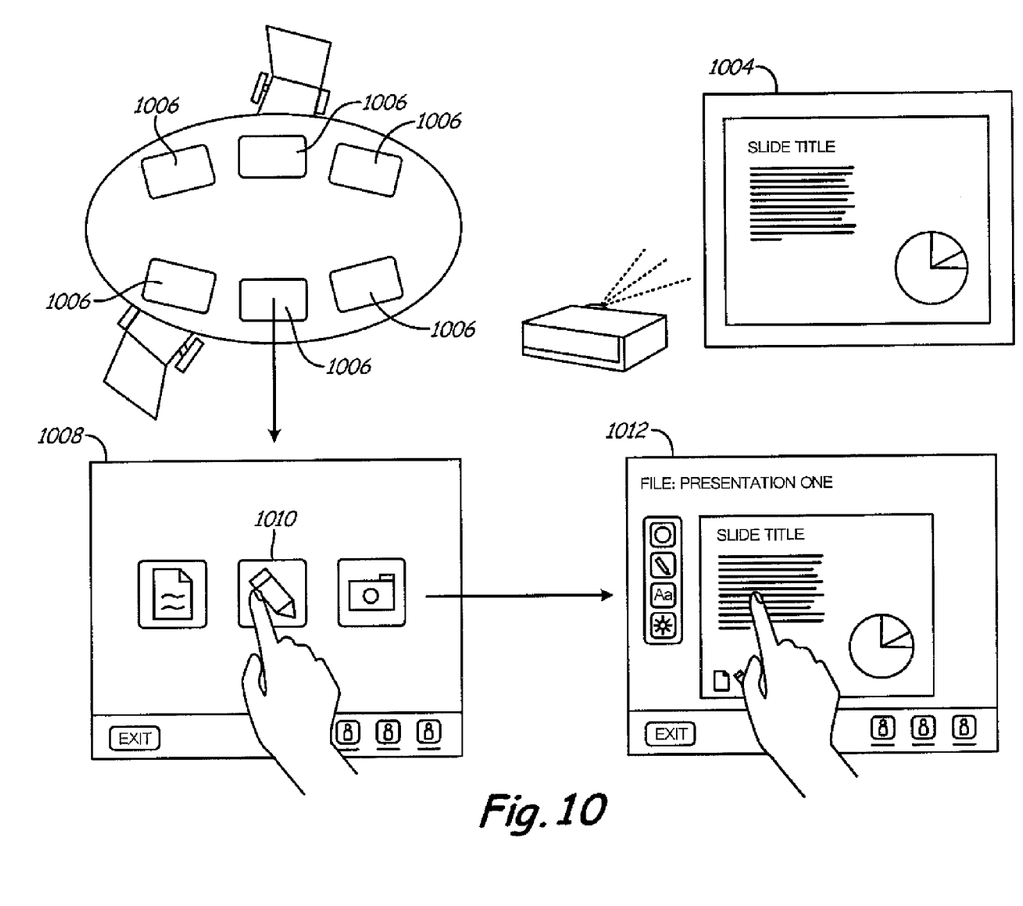
FIG. 10 is an illustration of a table with embedded synchronization panel technology.

FIG. 10 illustrates a scenario in which synchronization panel technology is embedded within a board room table 1002. The application acts as an annotation tool and allows all users to focus on the presentation as controlled by the presenter, but also allows them to annotate what they see on the screen. For instance, a large screen 1004 may display the presentation as controlled by the presenter. The large screen 1004 illustratively enables the multiple people in the room to simultaneously view the same material. Additionally, each person at table 1002 has his or her own individual touchscreen 1006 that enables them to make their own private annotations. For example, in screen 1008, a presentation view selects an annotation icon 1010, and is presented with an annotation screen 1012 that enables him or her to annotate (e.g. highlight, make text notes, etc.) the presentation currently being shown on screen 1004.

SECTION III. EXAMPLES OF SYNCHRONIZED PANEL TECHNOLOGY USE

The following paragraphs in Section III (i.e. paragraphs 69-82) describe a hypothetical chain of events that illustrate how synchronized panel technology may be used in a real-life situation.

Widgets, Inc. calls a meeting to review their quarterly numbers. Run by the CFO, the meeting will be attended by C-Level Executives as well as the VP of Sales. The VP of Marketing will be attending via teleconference.

Prior to the meeting the CFO's assistant sets up the meeting from their tablet computer. The assistant launches a meeting management app on the tablet computer and proceeds to login. The assistant is then presented with a screen allowing them to "Setup Meeting", "Start Meeting", "Previous Meetings" or "Logout", they select "Setup Meeting". This brings them to a screen asking them to provide information about the meeting. The assistant enters a meeting title, sets the CFO as meeting owner, defines the time, date and duration of the meeting and hits the "Continue" button to proceed to the next step. Once the assistant hits "Continue", the app checks the schedule to make sure the new meeting does not conflict with an existing one. If a conflict is found, the app provides the assistant with contact info for the conflicting meeting's creator as well as the option to adjust the time and date of the new meeting.

In this case, the app is able to schedule the meeting without conflict and takes the assistant to a screen allowing them to add meeting files. The assistant is presented with a screen showing the various file stores they have access to. The files needed for the meeting are in the assistant's network user folder so they select "User Folder" which brings up a list of files that can be added to the meeting. The assistant selects the main presentation file and is presented with the option to "Add to Presenter" or "Add to All". "Add to Presenter" is selected and the file is added only to the Presenter's file list. Next the assistant selects a file which contains a meeting overview. With the same options presented, the assistant selects "Add to All", adding the file to all attendee's file list. At this point the meeting is setup so the assistant presses "Save Meeting", this brings up the main options screen where "Logout" is selected.

Ten minutes before the meeting, the CFO enters the conference room to get setup for the meeting. He walks up to the table, badges-in and is presented with a list of meetings that he has organized or has been scheduled to attend. He selects today's meeting and is presented with a screen showing a table HUD, a list of available file stores, available applications and a list of meeting files specified during setup. At this point the meeting's title is displayed on all other screens on the table as well as the main screen.

Before entering the conference room, the CFO made a few changes to his presentation causing the version in his meeting files list to be out of date. He pulls out a USB thumb drive and plugs it into the table in-front of him. Once the table has mounted the drive it shows up in his available file stores. He selects the USB drive, finds the updated presentation file and selects it. He's presented with the option to "Add to Meeting" which he selects.

A few moments later, the meeting attendee's begin to enter the room. As each one enters, they make their way to a seat around the table and either gesture to activate their screen as a guest or badge-in to get access to their file stores and applications. As each screen is activated, the table HUD on each screen updates to show the name and title of the person sitting in each seat. Also on an LCD screen in the room a diagram of the table is also updated with the name of the person who just badged in.

The VP of Marketing is unable to make the meeting in person, but has joined the meeting using her tablet. Her name appears on the table diagram with an indication that she is remote. Users are also able to see on the screen in the room a video stream of her and her name and title. As a remote attendee, the VP of Marketing has access to various cameras in the conference room as well as the option to screen share the main screen using the meeting app on her tablet computer.

As the room settles in, the CFO gets the meeting started by opening the "Meeting Overview" document to go over what will be covered in the meeting. Once he opens the document on the table in front of him he is presented with the option to show it on the main screen, which he selects. Once the overview is completed the CFO proceeds then opens the presentation by selecting the file from the "Meeting Files" list. He again is presented with the option to show it on the main screen, which he does.

This launches the presentation on the main screen in the room which is being projected on a wall. The interface on the table changes to a presenter mode on the presenter's screen and dims the attendee's screen with options to "Request Control" or "Take Screen Shot". Midway through the presentation, a chart comes up detailing sales numbers at a national level. At this point the CEO requests to see more detailed numbers, specifically for Texas, to see if a recent marketing push has affected sales.

The CFO closes the presentation and opens his "Report Modification" application which brings up a map of the US on his screen and other controls that allow him to manipulate the data in the report. As he taps Texas on his interface, the chart on the main screen updates in real-time to show the numbers for Texas. The CEO then presses the "Request Control" button on his screen. This brings up a notification on the presenter's screen that control has been requested. The CFO selects "Allow" and the CEO's screen becomes active. The CEO then sees the same "Report Modification" app on his screen and adjusts the time frame from 3 months to 6 months causing the chart to update once again.

Noticing a spike in a certain area of the chart, the CEO selects the "Annotation Tools". This brings up a copy of the chart on his screen where he is able to circle success areas and point out areas that could still improve and have the annotations displayed on the main screen. The VP of Marketing has also been watching the report being updated while on her tablet computer. While the interface is not exactly similar to the larger version being presented in the meeting room, she still sees all of the data. She then requests and gains access to the controls and decides to change the time frame of the report to highlight an area that illustrates the effectiveness of a recent marketing campaign in that region. The application updates the view for all attendees.

While this is going on, the VP of Sales decides that he wants to record this view so that he can review it later. He selects "Take Screen Shot" on his screen which captures the annotated chart from the main screen and presents him with the option to save to "User Folder" or "Email". The VP elects to have the screen shot emailed to him.

At this point, control is returned to the CFO who returns to the presentation application and finishes his presentation. The meeting has concluded and the CFO logs out of the application on the table and an alert is presented that asks if the meeting is over. He selects 'Yes' and all screens are returned to their default state.

A few days later the VP of Sales has been reviewing the information he gathered in the meeting with his team. He decides that he would like to review one of the slides that he was shown during the meeting and the annotations that were added by the CEO. He opens up the SyncPanel application on his tablet computer and selects the meeting that he was just in and is presented with a list of the documents that were shown and the annotations that were recorded. He then loads the annotation and shows it to his colleagues. These colleagues are given action items to research the information so the VP of Sales selects the annotation and has a screen shot emailed to these individuals.

SECTION IV. CONCLUSION/SUMMARY

While over the past decade many advances have occurred in the development and use of telecommunication and telepresence technologies to enable remote collaboration, very few have focused on enabling a more seamless meeting experience such that information can be easily presented and collaborated on between individuals who are at the same location. These technologies also fail to enable the remote user to replicate the experience of an in-person meeting which could lead to a decreased sense of inclusion and thus limit the effectiveness of collaboration. Also, many of the existing remote meeting and telepresence technologies fail to take into account how remote users access large data sets on screens that utilize different form factors and resolutions (i.e. the meeting taking place on high resolution screens in the meeting room and small low resolution PDAs and tablets that are used at remote locations)

Synchronized panel technology encompasses both hardware and software solutions to solve these dilemmas. The hardware encompasses touch based displays that can be embedded into board room tables, portable touch based LCD kiosks, and off the shelf systems such as tablet computers and Android based PDAs and tablets. The software platform enables the synchronization of data and files across all of these hardware platforms, as well as legacy systems, and includes UI that is specific to the targeted device's resolution and form factor. The software platform also enables developers to build applications that access existing legacy infrastructure and data resources and build applications that are targeted at company specific use cases, while making use of the data synchronization technology and enabling an interaction model consistent with the synchronized panel technology.

Some possible benefits of at least certain embodiments include: enabling executives to view and collaborate on documents (PPT, DOC, etc); enabling analysts to provide the executives with data sets that they can manipulate and interact with; allowing users to collaborate in real-time on the data sets and documents; recording notes and annotations based on that collaboration; allowing users to interact with the data using the latest advances in haptics technologies (touch, gesture, etc); and making use of any other technologies which will help drive user engagement with the data. Additionally, combined, these features will provide the user with an interactive and engaging experience that provides them with consistent and predictable access to their data and allow them to share information and collaborate with very little setup and configuration.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to synchronized panel technology, it will be appreciated by those skilled in the art that the teachings of the disclosure can be applied to other types of systems, without departing from the scope and spirit of the disclosure.

What is claimed is:

1. A computer-implemented method comprising:
a processing component receiving a selection of a meeting from a list of meetings by a presenter;
a processing component receiving a selection of content from a presenter;
the processing component receiving indications of a first form factor for a first screen that is accessible to the presenter and a second form factor for a second screen that is accessible to an attendee of the meeting;
the processing component generating a first user interface that includes the content in a first configuration and providing the first user interface to the first screen in real time as a response to the selection of the content by the presenter; and
the processing component generating a second user interface that includes the content in a second configuration that is different from the first configuration and providing the second user interface to the second screen in real time as a response to the selection of the content by the presenter.

2. The method of claim 1, and further comprising:
receiving indications of a first resolution for the first screen and a second resolution for the second screen; and
wherein generating the first and the second user interfaces includes utilizing the indications of the first and the second resolutions in generating the user interfaces.

3. The method of claim 1, and further comprising:
receiving an alteration to the content from the presenter ; and
displaying the content alteration in real time on the second screen.

4. The method of claim 1, wherein the processing component is part of a cloud computing network.

5. The method of claim 1, wherein the first and the second screens are multitouch screens.

6. The method of claim 1, further comprising receiving audio spoken into a microphone by the presenter and providing the audio in real time to a computing device associated with the second screen.

7. The method of claim 1, and further comprising:
providing annotating tools to each of the first and the second user interfaces.

* * * * *